(12) United States Patent
Chang et al.

(10) Patent No.: US 8,274,938 B2
(45) Date of Patent: Sep. 25, 2012

(54) METHOD AND SYSTEM FOR COORDINATING PROTOCOL STACK ENTITIES TO SHARE SINGLE RADIO RESOURCE

(75) Inventors: Chia-Lan Chang, Taipei County (TW); Chen-Hsuan Lee, Taipei (TW); Chih-Hao Chen, Taipei County (TW); Yu-Tsun Nien, Changhua County (TW); Li-Chi Huang, Taipei Hsien (TW); Keng-Ming Huang, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 419 days.

(21) Appl. No.: 12/473,423

(22) Filed: May 28, 2009

(65) Prior Publication Data

US 2010/0304782 A1 Dec. 2, 2010

(51) Int. Cl.
*H04Q 7/00* (2006.01)
*H04J 3/16* (2006.01)
(52) U.S. Cl. .................................. 370/329; 370/466
(58) Field of Classification Search ............... 370/329, 370/331, 335, 336, 466, 469
See application file for complete search history.

(56) References Cited

U.S. PATENT DOCUMENTS

| | | | |
|---|---|---|---|
| 2004/0203788 A1* | 10/2004 | Fors et al. | 455/439 |
| 2008/0161001 A1* | 7/2008 | Holcman et al. | 455/436 |
| 2008/0318621 A1* | 12/2008 | Fan et al. | 455/552.1 |
| 2009/0149220 A1* | 6/2009 | Camilleri et al. | 455/558 |
| 2009/0187759 A1* | 7/2009 | Marsico | 713/155 |
| 2010/0248782 A1* | 9/2010 | Cheon | 455/558 |
| 2011/0012987 A1* | 1/2011 | Yoon | 348/14.02 |
| 2011/0086609 A1* | 4/2011 | Buehler et al. | 455/404.2 |

FOREIGN PATENT DOCUMENTS

CN 101203005 6/2008
CN 101222715 7/2008

* cited by examiner

*Primary Examiner* — Andrew Lee
(74) *Attorney, Agent, or Firm* — Thomas|Kayden

(57) ABSTRACT

The invention discloses a method for coordinating protocol stack entities to share a single radio resource, executed by a processor of a mobile station, including the step of: after a first protocol stack entity for a first subscriber identity card enters a TALKING mode or enables a dial-up service, forcing a second protocol stack entity for a second subscriber identity card to release the radio resource or suspend utilization of the radio resource, and enabling the radio resource to be utilized to perform requisite operations or procedures of the TALKING mode or the dial-up service.

20 Claims, 15 Drawing Sheets

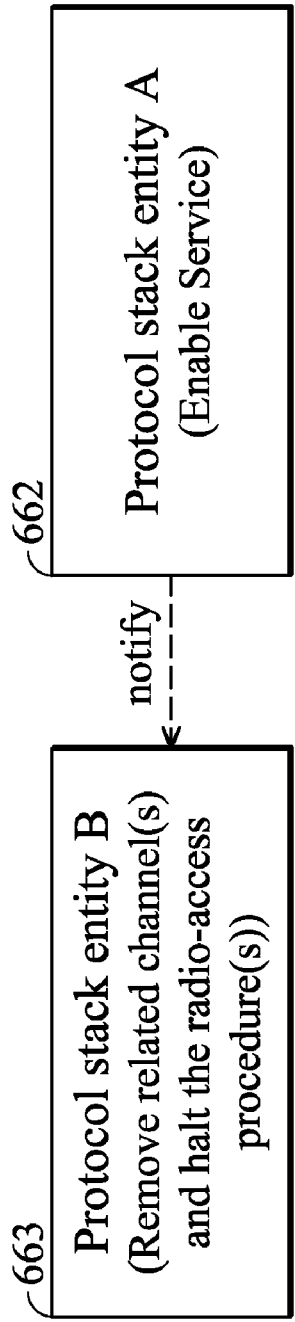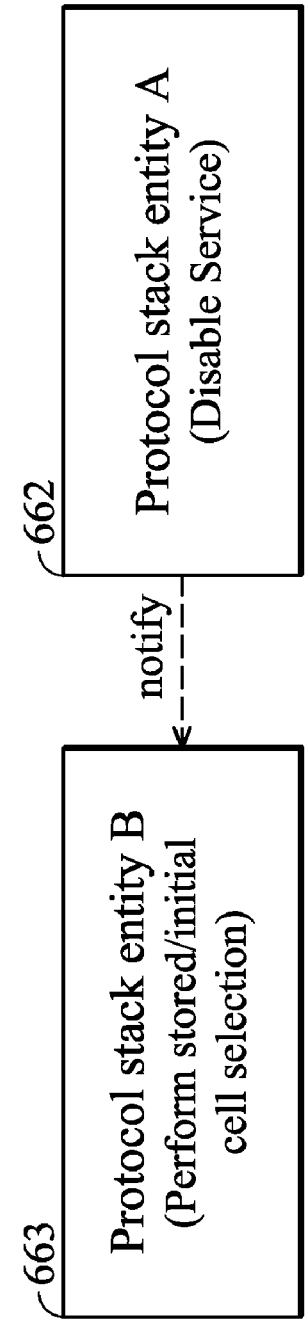
FIG. 7A
FIG. 7B

METHOD AND SYSTEM FOR COORDINATING PROTOCOL STACK ENTITIES TO SHARE SINGLE RADIO RESOURCE

BACKGROUND OF THE INVENTION

1. Field of the Invention

The invention relates generally to a method and a system for coordinating protocol stack entities to share a single radio resource.

2. Description of the Related Art

A subscriber identity module (SIM) on a removable SIM card securely stores the service-subscriber key used to identify a subscriber on mobile stations (such as computers and mobile phones). The SIM card allows users to change phones by simply removing the SIM card from one mobile phone and inserting it into another mobile phone or telephony device.

For a protocol stack (PS) entity executed in a mobile station comprising a single SIM card and a single Baseband/radio-frequency (RF) module, the mobile station is able to provide telephony services on the SIM card. In another case, for two protocol stack entities executed in a dual-USIM-supported mobile station comprising two universal SIM (USIM) cards and only one Baseband/RF module, the dual-mode mobile station is able to remain at a STANDBY mode for both USIM cards, and enter a TALKING mode or dial-up service for one of the USIM cards. In the STANDBY mode, the single Baseband/RF module may be utilized to listen to both paging occasions from the two USIM cards. However, when one of the USIM cards is in the TALKING mode or dial-up service, the hardware resource (Baseband/RF module) will be fully occupied, restricting another protocol stack entity from utilizing the hardware resource at the same time.

BRIEF SUMMARY OF THE INVENTION

The invention discloses a method for coordinating protocol stack entities to share a single radio resource, executed by a processor of a mobile station, comprising the step of: after a first protocol stack entity for a first subscriber identity card enters a TALKING mode or enables a dial-up service, forcing a second protocol stack entity for a second subscriber identity card to release the radio resource or suspend utilization of the radio resource, and enable the radio resource to be utilized to perform requisite operations or procedures of the TALKING mode or the dial-up service.

The invention discloses a system for coordinating protocol stack entities to share a single radio resource, comprising a radio frequency (RF) module, a first subscriber identity card, a second subscriber identity card and a processor. The processor is coupled to the RF module and the first and second subscriber identity cards, and executes a first protocol stack entity for the first subscriber identity card, and a second protocol stack entity for the second subscriber identity card in a multi-tasking environment. When executing, the first protocol stack entity forces the second protocol stack entity to release the RF module or suspend utilization of the RF module after the first protocol stack entity enters the TALKING mode or enables a dial-up service, and enables the RF module to be utilized to perform requisite operations or procedures of the TALKING mode or the dial-up service.

BRIEF DESCRIPTION OF THE DRAWINGS

The invention can be more fully understood by reading the subsequent detailed description and examples with references made to the accompanying drawings, wherein:

FIG. 7A shows a first embodiment of forcing a protocol stack entity into a SUSPEND mode;

FIG. 7B shows a first embodiment of invoking a protocol stack entity from a SUSPEND mode;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
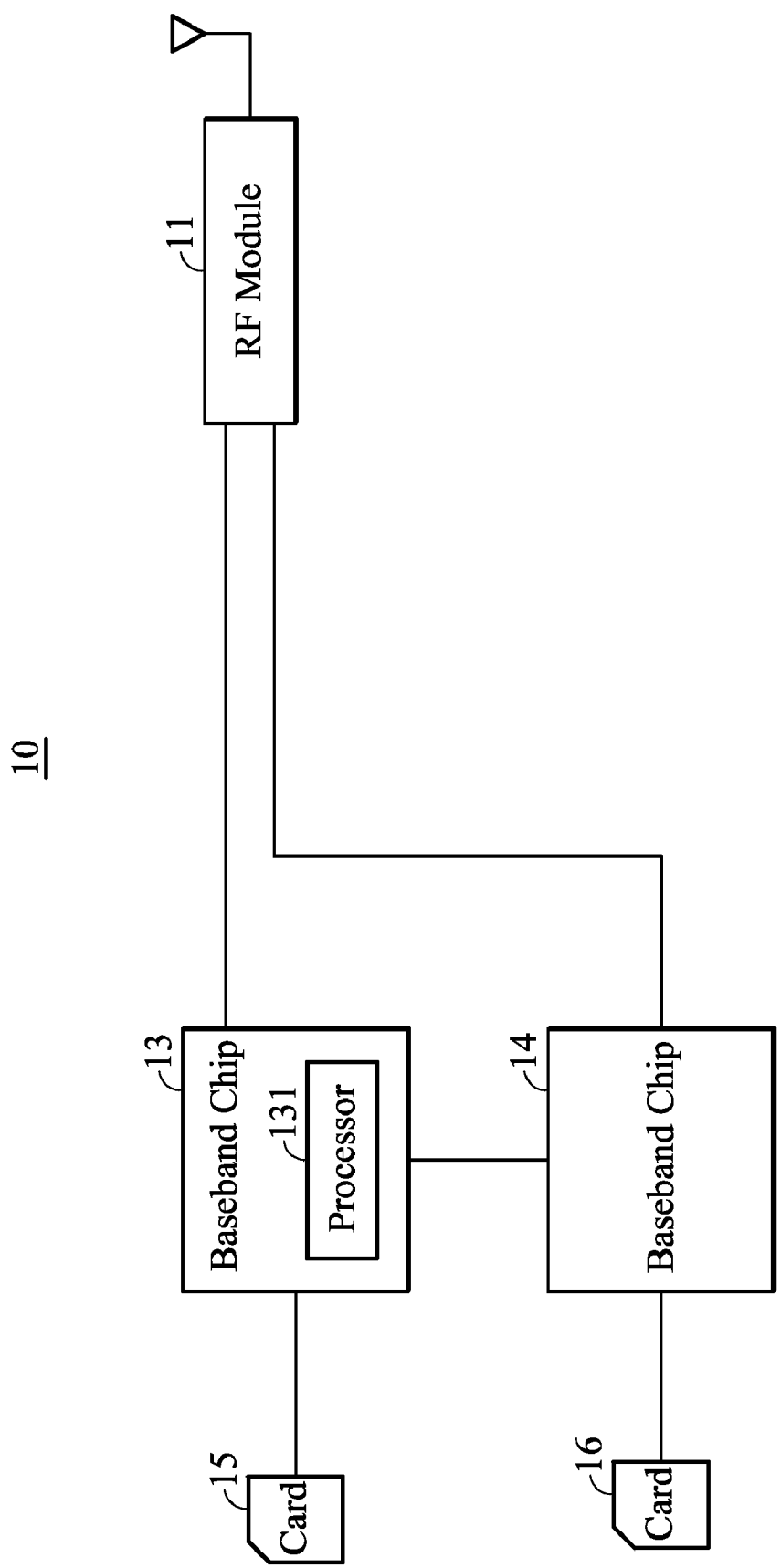
FIG. 1 shows a diagram of an embodiment of a mobile station.

As shown in FIG. 1, a mobile station (MS) 10 may be equipped with a single RF module 11 and Baseband chips 13 and 14 (where the Baseband chip 13 comprises a processor 131), and two subscriber identity module (SIM) or universal subscriber identity module (USIM) cards 15 and 16 may be plugged in into two sockets of the MS 10 connecting to the Baseband chips 13 and 14 respectively, where each SIM or USIM card 15 or 16 is provided by a particular network operator. The MS 10 can therefore simultaneously camp on two cells provided by either the same network operator or different network operators for the plugged in SIM cards 15 and 16 and operate in an IDLE/STANDBY modes, or even DEDICATE modes, using the RF module 11 and Baseband chips 13 and 14. The Baseband chip 13 or 14 reads data from a particular SIM or USIM card 15 or 16 and writes data to the SIM/USIM card 15 or 16.

Figure 2:
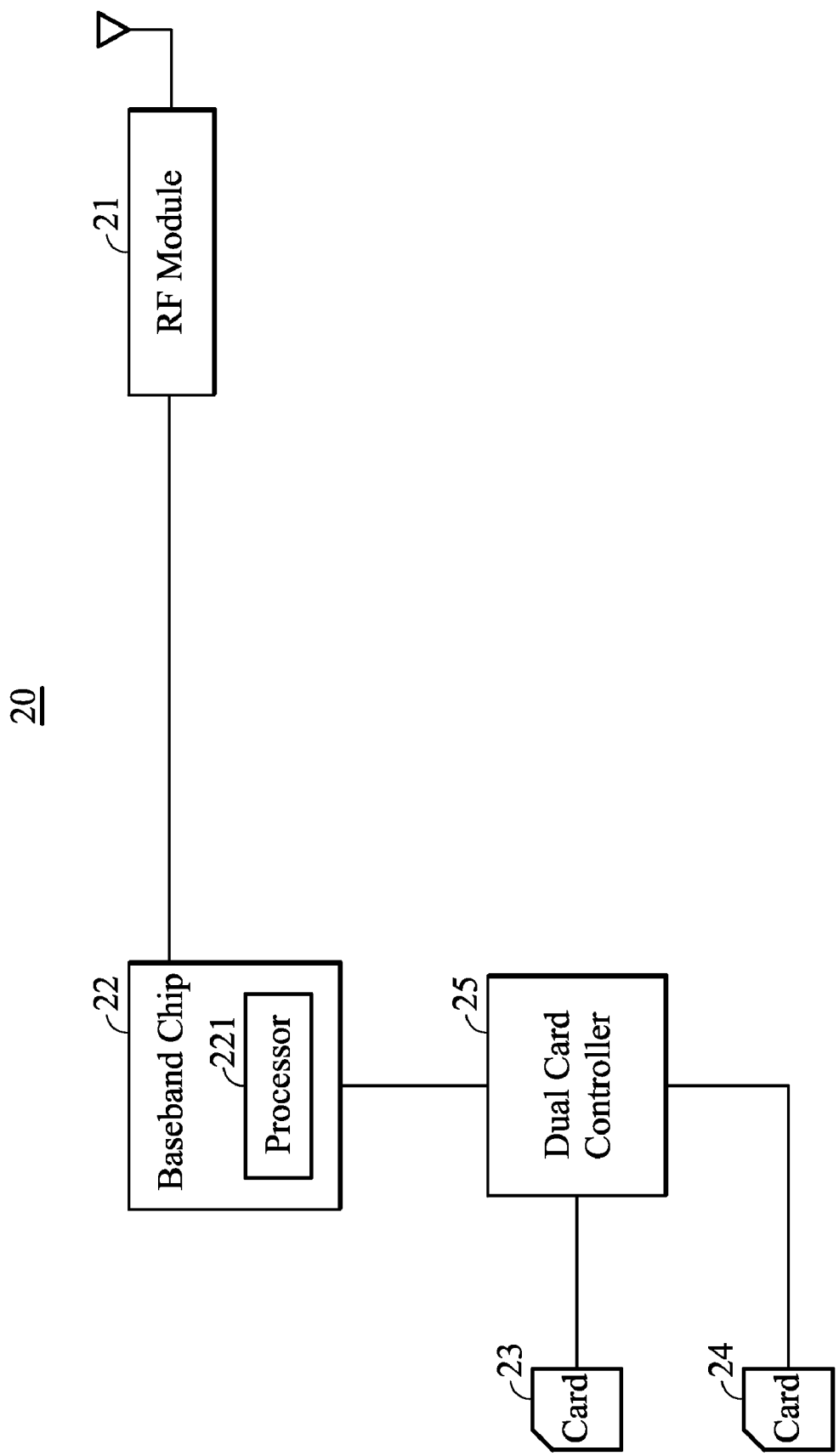
FIG. 2 shows a diagram of an embodiment of a mobile station.

As shown in FIG. 2, an MS 20 may be equipped with a single RF module 21 and a Baseband chip 22 comprising a processor 221, and two SIM or USIM cards 23 and 24 may be plugged in into two sockets of the MS 20 connecting to the single Baseband chip 22. The MS 20 can therefore simultaneously camp on two cells provided by either the same network operator or different network operators for the plugged in SIM cards 23 and 24 and operate in STANDBY modes using the single RF module 21 and Baseband chip 22. A dual SIM controller 25 is coupled/connected between the Baseband chip 22 and two SIM/USIM cards 23 and 24 and powered by a power management integrated chip (PMIC) (not shown) and a battery (not shown). The Baseband chip 22 reads data from one of SIM/USIM cards 23 and 24 and writes data to one of SIM/USIM cards 23 and 24 via the dual SIM controller 25. The dual SIM controller 25 powers the SIM/USIM cards 23 and 24 with the same or different voltage levels according to requirements thereof, wherein the voltage level for each SIM/USIM card 23/24 is determined during initiation. In addition, the dual SIM controller 25 selectively transfers the SIM/USIM clock, reset and data signals to the SIM/USIM cards 23/24 according to instructions issued by the Baseband chip 22.

A SIM card (such as 15 and 16 shown in FIGS. 1, and 23 and 24 shown in FIG. 2) typically contains user account information, an international mobile subscriber identity (IMSI) and a set of SIM application toolkit (SAT) commands and provides storage space for phone book contacts. A microprocessing unit (MCU) of the baseband chip (simply referred to as a baseband MCU hereinafter) may interact with MCUs of SIM cards (each simply referred to as a SIM MCU hereinafter) to fetch data or SAT commands from the plugged in SIM cards. An MS is immediately programmed after plugging in the SIM card. SIM cards may be also programmed to display custom menus for personalized services. A SIM card may further store a Home Public-Land-Mobile-Network (HPLMN) code to indicate the SIM card network operator provider. An Integrated Circuit Card Identity (ICCID) SIM serial number is printed on the SIM card for identification.

A USIM card (such as USIM cards 15 and 16 shown in FIG. 1, and USIM cards 23 and 24 shown in FIG. 2) is inserted in an MS for Universal Mobile Telecommunications System, Wideband Code Division Multiple Access or Time Division-Synchronous Code Division Multiple Access (UMTS, WCDMA or TD-SCDMA, also called 3G) telephony communications. The USIM card stores user account information, IMSI, authentication information and a set of USIM application toolkit (USAT) commands and provides storage space for text messages and phone book contacts. A USIM card may further store an HPLMN code to indicate the SIM card network operator provider. A Baseband MCU may interact with an MCU of a USIM card (each simply referred to as a USIM MCU hereinafter) to fetch data or SAT commands from the plugged in USIM cards. The phone book on the USIM card has been greatly enhanced from that on the SIM card. For authentication purposes, the USIM card may store a long-term preshared secret key K, which is shared with the Authentication Center (AuC) in the network. The USIM MCU may verify a sequence number that must be within a range using a window mechanism to avoid replay attacks, and is in charge of generating the session keys CK and IK to be used in the confidentiality and integrity algorithms of the KASUMI (also termed A5/3) block cipher in the UMTS. An MS is immediately programmed after plugging in the USIM card. An ICCID USIM serial number is printed on the USIM card for identification.

In addition, a removable user identity module card (R-UIM card) or Code Division Multiple Access (CDMA) subscriber identity module card (CSIM card) is developed for a CDMA MS that is equivalent to the Global System for Mobile communication (GSM) SIM and 3G USIM and capable of working in CDMA networks. The R-UIM or CSIM card is physically compatible with the GSM SIM card, and provides similar security mechanism for the CDMA system.

The IMSI described above is a unique number associated with a GSM or a UMTS network user. The IMSI may be sent by the ME to a GSM or UMTS network to acquire other details of the mobile user in the Home Location Register (HLR) or as locally copied in the Visitor Location Register (VLR). An IMSI is typically 15 digits long, but can be shorter (for example MTN South Africa's IMSIs are 14 digits). The first 3 digits are the Mobile Country Code (MCC), followed by the Mobile Network Code (MNC), which is either 2 digits (European standard) or 3 digits (North American standard). The remaining digits are the mobile subscriber identification number (MSIN) for a GSM or UMTS network user.

Figure 3:
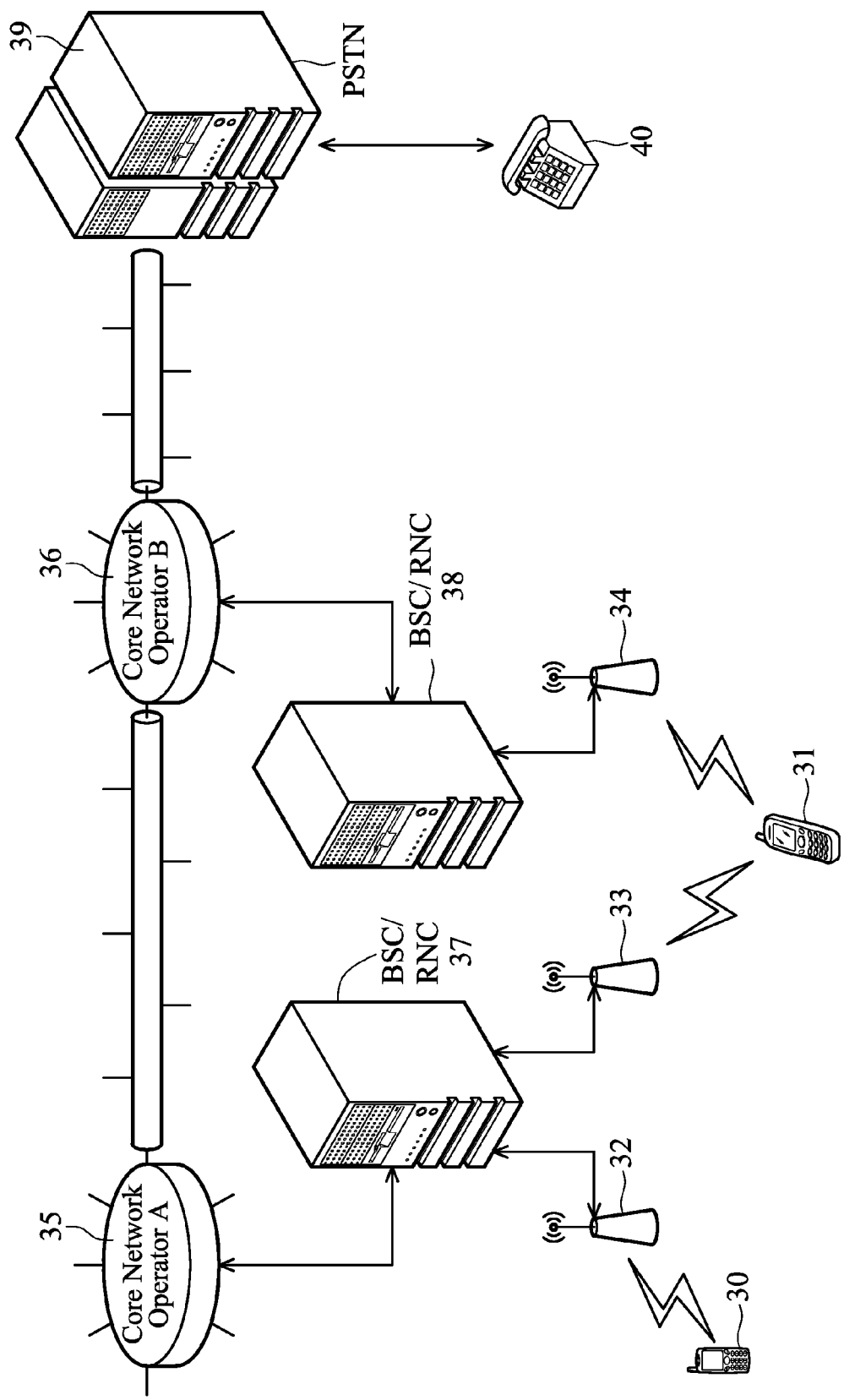
FIG. 3 shows a diagram of a mobile communication network system.

As shown in FIG. 3, an MS 31 with dual SIM/USIM cards may simultaneously access two core networks 35 and 36 such as GSM, WCDMA, TD-SCDMA networks and the like after camping on two cells 33 and 34 managed by one or more base stations or node-Bs. The MS 20 may make a voice or data call to a called party (e.g. mobile station 30 or phone 40) through the GSM network with a Base Station Controller (BSC), WCDMA/TD-SCDMA network with a Radio Network Controller (RNC), Public Switched Telephone Network (PSTN) 39, or any combinations thereof using one of the equipped SIM/USIM cards. Moreover, the MS 31 may receive a phone call with one of the SIM/USIM cards from a calling party.

Following, the related aspects of a GSM system will be introduced. The MS 10, 20 or 31 can be operated in an IDLE mode or dedicated mode for each inserted SIM card. The MS is either powered off, or searches for or measures the Broadcast Control Channel (BCCH) with better signal quality from a base station provided by a specific core network operator (for MS 31, it may search for or measure the Broadcast Control Channel with better signal quality from the base station or node-B 33 provided by the core network operator 35, or from the base station or node-B 34 provided by the core network operator 36), or is synchronized to the BCCH of a specific base station and ready to perform a random access procedure on the Random Access Channel (RACH) for requesting a dedicated channel. In a dedicated mode, the MS 31 occupies a physical channel and tries to synchronize with the physical channel, and establishes logical channels and switches among the logical channels.

Specifically, for each inserted SIM card in an IDLE mode, the MS 31 continuously listens to the BCCH from a base station (e.g. 33 or 34) and reads the BCCH information and conducts periodic measurements of the signaling strength of the BCCH carriers in order to select a cell to be camped on. In an IDLE mode, no exchange of signaling messages is presented with the network. The data required for Radio Resource Management (RR) and other signaling procedures is collected and stored, such as the list of neighboring BCCH carriers, thresholds for RR algorithms, Common Control Channel (CCCH) configurations, information regarding the use of RACH and Paging channel (PCH), or others. Such kind of information is broadcast by the base station on the BCCH, SYSTEM INFORMATION, SI, Types 1-4) and therefore is available to all MSs currently in the cell. The SI comprises a PLMN code uniquely owned by a network operator. The PLMN code comprises a Mobile Country Code (MCC) and a Mobile Network Code (MNC), and indicates which network operator provides communication services. In addition, a cell identity (ID) indicating which cell broadcasts the BCCH is also contained in the SI. The PLMN code may be acquired and stored in a corresponding SIM card of the electronic device upon receiving the SI from the BCCH. The BSS further continuously sends on all PCHs of a cell valid Layer 3 messages (PAGING REQUEST) which the MS 30 can decode and recognize if its address (e.g. its IMSI of a specific SIM card) is paged. The MS 31 periodical monitors the PCH to avoid paging call loss.

Each exchange of signaling messages with the network, e.g. BSS, Mobile Switching Center (MSC) and the similar, requires an RR connection and the establishment of an LAPDm connection between the MS and BSS. Setting up the RR connection can be initiated by the MS or network. In either situation, the MS 31 sends a channel request (CHANQUEST) on the RACH in order to get a channel assigned on the Access Grant Channel (AGCH), also referred to as an immediate assignment procedure. The channel request may be rejected by an immediate assignment reject procedure. If the network does not immediately answer the channel request, the request is repeated for a certain number of times. In the situation of a network-initiated connection, a procedure is preceded by a paging call (PAGING REQUEST) to be answered by the MS (PAGING RESPONSE). After an RR connection has been successfully completed, higher protocol layers, Connection Management (CM) and Mobility Management (MM) can receive and transmit signaling messages.

In contrast to the setup of connections, the release is typically initiated by the network (CHANNEL RELEASE). The release may occur at the end of a signaling transaction, when there has been too many errors, during removal of the channel in favor of a higher priority call, e.g. emergency call, or at the end of a call.

Once an RR connection has been set up, the MS 31 has either a Stand-alone Dedicated Control Channel (SDCCH) or a Traffic Channel (TCH) with associated Slow/Fast Associated Control Channel (SACCH/FACCH) available for exclusive bidirectional use.

Setting up an MM connection from the MS 31 presumes the existence of an RR connection, but a single RR connection can be used by multiple MM connections. If the MM connection can be established, the MS sends the message CM-SERVICE REQUEST to the network 35 or 36. The message CM-SERVICE REQUEST contains information regarding a mobile subscriber (IMSI or TMSI), where the TMSI has only local significance within a Location Area and has to be used together with the LAI for the unique identification of a subscriber, as well as information regarding the requested service (outgoing voice call, short message service SMS transfer, activation or registration of a supplementary service, or others). If the MS receives the message CM-SERVICE ACCEPT or a local message from the RR sublayer that enciphering was activated, it is treated as an acceptance of the service request, and the requesting CM entity is informed about the successful setup of an MM connection. Otherwise, if the service request has been rejected by the network, the MS receives a message CM-SERVICE REJECT, and the MM connection cannot be established.

Following, the related aspects of WCDMA and TD-SCDMA systems will be introduced. The MS 31 can be operated in an IDLE mode or connected mode for each inserted USIM card.

In an IDLE mode, the MS 31 selects (either automatically or manually) a PLMN to contact. The MS 31 continuously listens to a Broadcast Control Channel (BCCH) to acquire SYSTEM INFORMATION (SI) comprising a PLMN code uniquely owned by a network operator. The PLMN code comprises a Mobile Country Code (MCC) and a Mobile Network Code (MNC), indicating which network operator is providing communication services. In addition, a cell identity (ID) indicating which cell is broadcasting the BCCH is also contained in the SI. The PLMN code may be acquired and stored in a corresponding USIM card of the electronic device upon receiving the SI from the BCCH. The MS 31 searches for a suitable cell of the chosen PLMN, chooses that cell to provide available services, and tunes to its control channel, also referred to as "camping on a cell". After camping on a cell in an IDLE mode, the MS 31 can receive SI and cell broadcast messages from a base station or node-B 33 or 34. The MS stays in an IDLE mode until the MS transmits a request to establish a Radio Resource Control (RRC) connection. In an IDLE mode, the MS is identified by non-access stratum identities such as IMSI, TMSI and P-TMSI identities.

In the Cell_DCH state of a connected mode, a dedicated physical channel is allocated to the MS 31, and the MS is known by its RNC 37 or 38 on a cell or active set level. The MS 31 performs measurements and sends measurement reports according to measurement control information received from the RNC 37 or 38. The MS 31 with certain capabilities monitors the Forward Access Channel (FACH) for system information messages. In the Cell_FACH state of a connected mode, no dedicated physical channel is allocated for the MS 31, but Random Access Channel (RACH) and FACH are used instead, for transmitting both signaling messages and small amounts of user plane data. In this state, the MS 31 also listens to the Broadcast Channel (BCH) to acquire system information. The MS 31 performs cell reselections (refer to the details described below), and after a reselection typically sends a Cell Update message to the RNC 37 or 38, so that the RNC knows the MS 31 location on a cell level. In the Cell_PCH state of a connected mode, the MS 31 is known on a cell level in the SRNC, but the MS 31 can be reached only via the Paging Channel (PCH). The URA_PCH state of a connected mode is very similar to the Cell_PCH state, except that the MS 31 does not execute Cell Update after each cell reselection, but instead reads UMTS Terrestrial Radio Access Network (UTRAN) Registration Area (URA) identities from the BCH, and only if the URA changes (after cell reselection) does the MS 31 inform its location to the SRNC. The MS 31 leaves the connected mode and returns to IDLE mode when the RRC connection is released or during RRC connection failure.

The establishment of an RRC connection and Signaling Radio Bearers (SRB) between MS 31 and UTRAN (RNC 37 or 38) is initiated by a request from higher layers (non-access stratum) on the MS 31 side. In a network-originated case, the establishment is preceded by an RRC Paging message. The UTRAN (RNC 37 or 38) may respond with an RRC Connection Set-up message including a dedicated physical channel assignment for the MS 31 (move to the Cell_FACH state), or a command to instruct the MS to use common channels (move to the Cell_FACH state).

The details of cell selection and reselection are described below. A mobile station 31 in an IDLE mode must periodically measure the receivable BCCH carriers of the base stations in the area of the mobile station 31 and calculate mean values RXLEV(n) from the signal. Based on the measurement, the mobile station selects a cell, namely the one with the best reception, i.e. the mobile station is committed to the cell. This is called "camping" on this cell. In this state, accessing a service becomes possible, and the mobile station listens periodically to the PCH. Two criteria are defined for the automatic selection of cells: the path loss criterion C1 and the reselection criterion C2. The path loss criterion serves to identify cell candidates for camping. For such a cell, C1 has to be greater than zero. At least every 5 seconds, a mobile station has to recalculate C1 and C2 for the current and neighboring cells. If the path loss criterion of the current cell falls to below zero, the path loss to the current base station has become too large. Thus, a new cell has to be selected, which requires use of the criterion C2. If one of the neighboring cells has a value of C2 greater than zero, it will become the new current cell.

The cell selection algorithm uses two further threshold values, which are broadcast on the BCCH:

(1) the minimum received power level RXLEV_ACCESS_MIN (typically −98 to −106 dBm) required for registration with the network of the current cell.

(2) the maximum allowed transmitter power MS_TXPWR_CCH (typically 31-39 dBm) allowed for transmission on a control channel (RACH) before having received the first power control command.

In consideration of the maximum transmitter power P of a mobile station, the Path Loss Criterion C1 is defined using the minimal threshold RXLEV_ACCESS_MIN for network access and the maximum allowed transmitter power MS_TXPWR_MAX_CCH:

$$C1(n)=(RXLEV(n)-RXLEV\_ACCESS\_MIN-maximum(0, (MS\_TXPWR\_MAX\_CCH-P)))$$

The value of the path loss criterion C1 is determined for each cell so that a value EXLEV(n) of a BCCH carrier can be obtained. The cell with the lowest path loss can thus be determined using the criterion. It is the cell for which C1>0 has the largest value. During cell selection, the mobile station is not allowed to enter the conservation mode.

A prerequisite for cell selection is that the cell belongs to the home PLMN of the mobile station or that access to the PLMN of this cell is allowed. Beyond that, a limited service mode is defined with restricted service access, which allows for emergency calls. In a limited service mode, a mobile station can be camping on any cell but can only make emergency calls. Limited service call exists when there is no SIM card in the mobile station, the IMSI is unknown in the network or the IMEI is barred from service, but also if the cell with the best value of C1 does not belong to an allowed PLMN.

Once a mobile station is camping on a cell and is in an IDLE mode, it observes all the BCCH carriers with frequencies, the BA, broadcasted on the current BCCH. Having left the IDLE mode, e.g. if a TCH has been assigned, the mobile station monitors only the six strongest neighboring BCCH carriers. A list of the six strongest neighboring BCCH carriers has already been prepared and kept up to date in an IDLE mode. The BCCH of the camped-on cell is decoded at least every 30 seconds. At least once every 5 minutes, the complete set of data from the six strongest neighboring BCCH carriers is decoded, and the BSIC of each of the carriers is checked every 30 seconds. This allows the mobile station to stay aware of changes in its environment and to react appropriately. In the worst case, conditions have changed so much that a new cell needs to be selected to camp on (cell selection).

For the cell reselection, a further criterion C2, the Reselection Criterion, has been defined:

$$C2(n)=C1(n)+CELL\_RESELECT\_OFFSET-(TEMPORARY\_OFFSET*H(PENALTY\_TIME-T))$$

with $H(x)=0$ for $x<0$, and 1 for $x\geq 0$

The interval T in the criterion is the time passed for the mobile station to observe the cell n for the first time with a value of C1>0. The interval T is set back to 0 when the path loss criterion C1 falls to C1<0. The parameters CELL_RESELECT_OFFSET, TEMPORARY, and PENALTY_TIME are announced on the BCCH. But as a default, they are set to 0. Otherwise, the criterion C2 introduces a time hysteresis for cell reselection. The criterion C2 tries to ensure that the mobile station is camping on the cell with the highest probability of successful communication.

One exception for cell reselection is the case when a new cell belongs to another location area. In the case C2 must not only be larger than zero, but C2>CELL_RESELCT_HYSTERSIS to avoid too frequent location updates.

Figure 4:
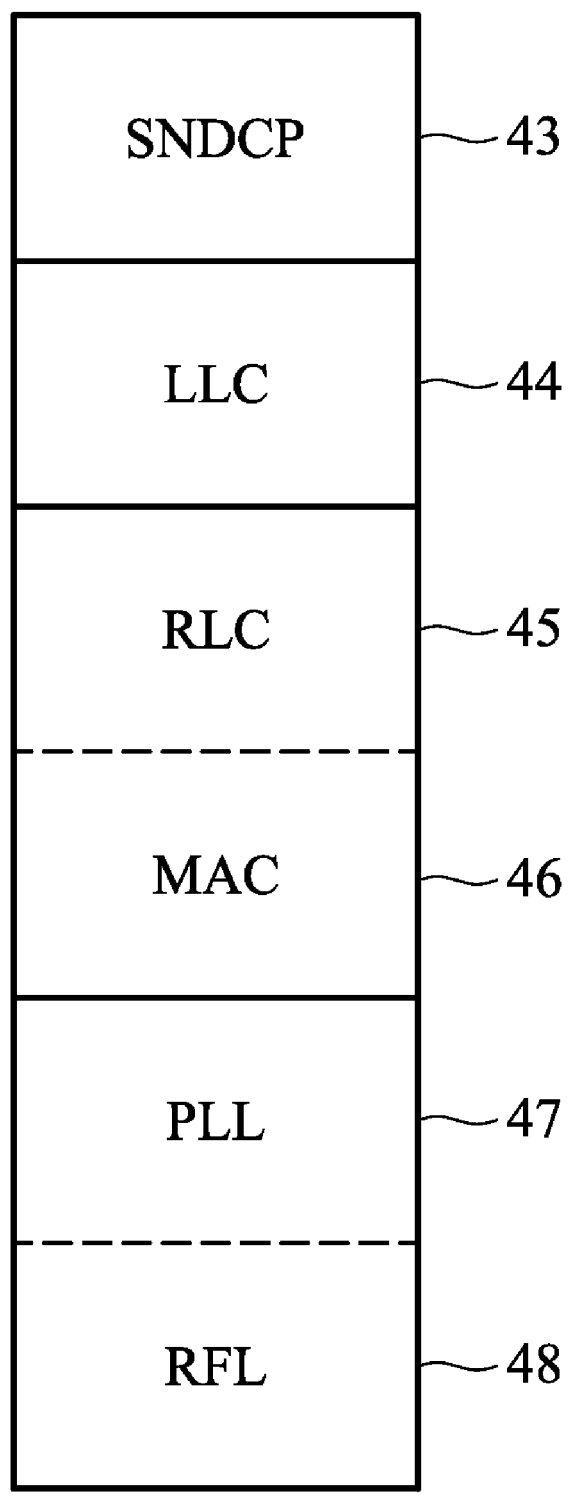
FIG. 4 shows an exemplary protocol architecture of the transmission plane of the Global System for Mobile communication network, utilized by a mobile station with a subscriber identity module card.

FIG. 4 shows an exemplary protocol architecture of the transmission plane of the GSM network, utilized by an MS with a SIM card. The physical layer operating with the RF module 21 may contain two sublayers: Physical Link Layer (PLL) 47 and Physical RF Layer (RFL) 48. The PLL 47 may provide a physical channel between an MS and a base station system (BSS). The RFL 48 may include modulation and demodulation. The Subnetwork Dependent Convergence Protocol (SNDCP) 43 may be used to transfers IP packets between the MS and its assigned Serving GPRS Support Node (SGSN). IP packets may contain at least HyperText Transfer Protocol (HTTP), Wireless Application Protocol (WAP), File Transfer Protocol (FTP), Simple Mail Transfer Protocol (SMTP), Post Office Protocol 3 (POP3) or Internet Mail Protocol (IMAP) messages, or others. The Logical Link Control (LLC) layer 44 may provide a reliable logical link between the MS and its assigned SGSN. The purpose of the Radio Link Control (RLC) layer 45 is to establish a reliable link between the MS and the BSS. The operations of the RLC layer include the segmentation and reassembly of the LLC frames into RLC data blocks. The Medium Access Control (MAC) layer 46 may control the access attempts of the MS on the radio channel. The MAC layer 46 may employ algorithms for contention resolution of access attempts, statistical multiplexing of channels and a scheduling and prioritizing scheme, which takes the negotiated QoS into account. The MAC protocol may additionally allow for a single MS to simultaneously use several physical channels (i.e. several times slots of the same TDMA frame). It may also control the statistical multiplexing. That is, control how several MSs can access the same physical channel (the same time slot of successive TDMA frames).

Figure 5:
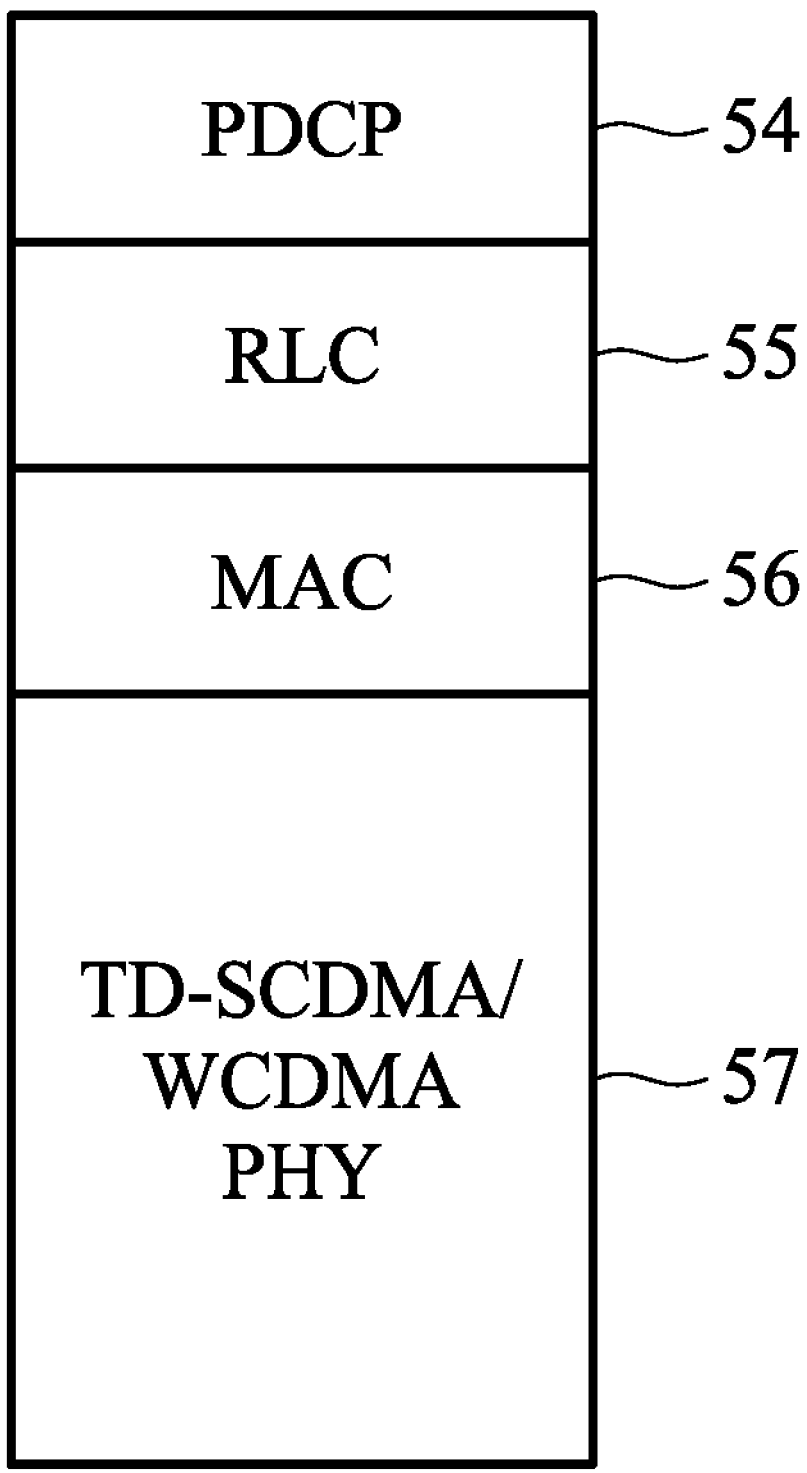
FIG. 5 shows an exemplary protocol architecture of the user plane of the Wideband Code Division Multiple Access/Time Division-Synchronous Code Division Multiple Access network, utilized by a mobile station with a universal subscriber identity module card.

FIG. 5 shows an exemplary protocol architecture of the user plane of the WCDMA/TD-SCDMA network, utilized by an MS with a USIM card. The TD-SCDMA/WCDMA physical (PHY) layer 57 operating with the RF module 21 may offer services to the Medium Access Control (MAC) layer 56 via transport channels. The transport channels are characterized by ways and types of data being transferred. The MAC layer 56 may offer services to the Radio Link Control (RLC) layer 55 by means of logical channels. The logical channels are distinguished by types of data being transmitted. The RLC layer 55 may offer services to higher layers via Service Access Points (SAPs), which describe how the RLC layer 55 handles the data packets. On the user plane, the RLC services are used either by the service-specific protocol layers, Packet Data Convergence Protocol (PDCP) 54. The PDCP may be present for the Packet Switching (PS) domain services. A main function of the PDCP is header compression.

Figure 6:
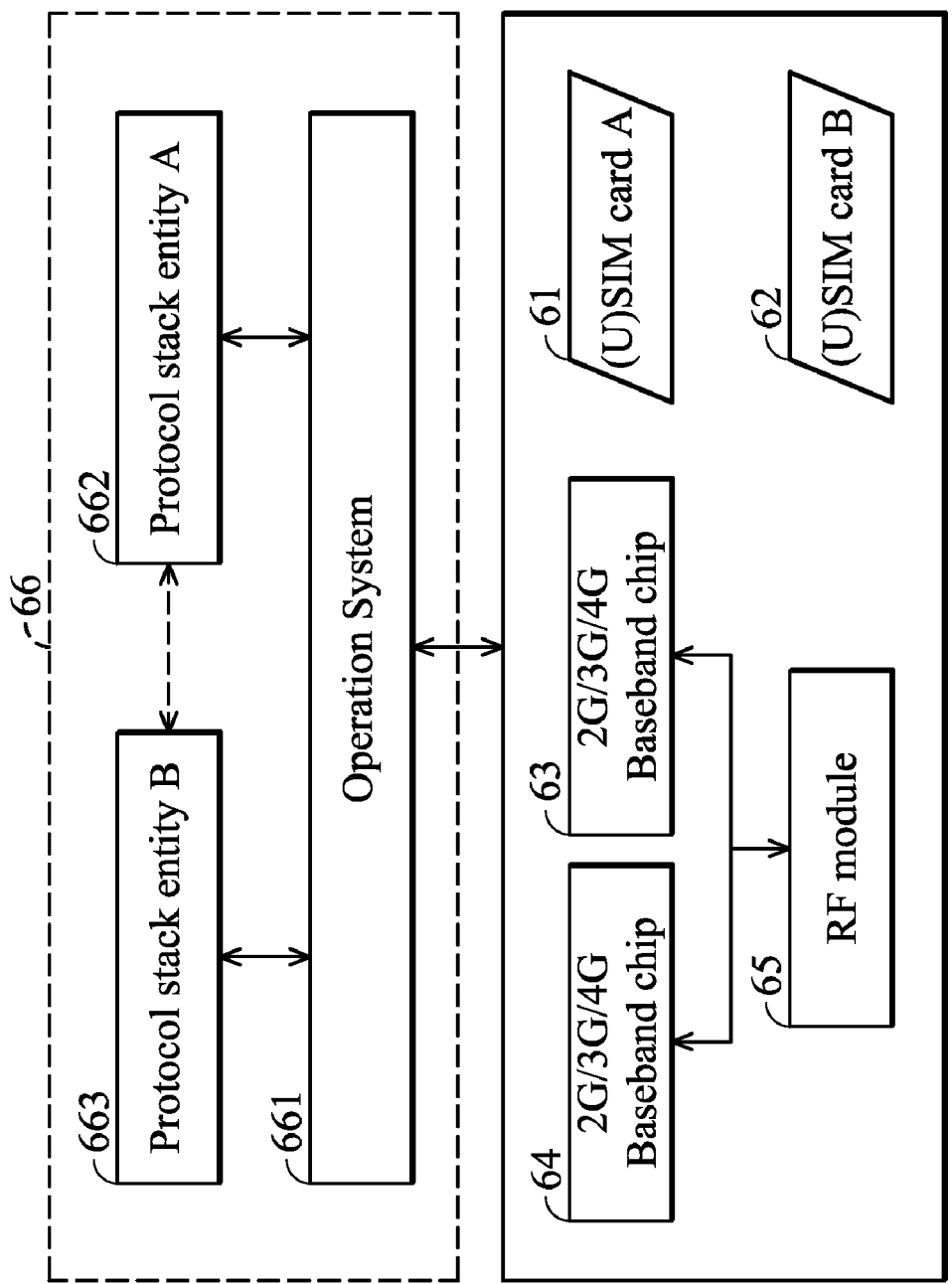
FIG. 6 shows a diagram of a mobile station according to an embodiment of the invention.

Referring to FIG. 6, a diagram of a mobile station 60 is shown according to an embodiment of the invention. The mobile station 60 contains dedicated hardware and software 66 executed by a general-purposed processing unit (e.g. 131 of FIG. 1 or 221 of FIG. 2). The hardware comprises a plurality of components utilized for performing radio access, such as a (U)SIM card A 61, a (U)SIM card B 62, a 2G/3G/4G Baseband chip 63, a 2G/3G/4G Baseband chip 64 and a RF module 65. The software 66 may contain at least an operation system (OS) 661, a protocol stack entity (module) A 662 and a protocol stack entity (module) B 663. The protocol stack entity A 662 may be a thread and may perform layer 2 tasks (such as the SNDCP 43, LLC 44, RLC 45 and MAC 46 for GSM system, or PDCP 54, RLC 55 and MAC 56 for TD-SCDMA or WCDMA system, or others) for one of the (U)SIM card A 61 and (U)SIM card B 62 while the protocol stack entity B 663 is another thread for the other (U)SIM card. The protocol stack entity A 662 or entity B 663 may also perform layer 1 functions operating the RF module 65 (such as PLL 47 and RFL 48 for GSM system, or TD-SCDMA/WCDMA PHY 57 for TD-SCDMA or WCDMA system, or others). The protocol stack entity A 662 or entity B 663 may contain logic to instruct another external entity to perform layer 1 functions operating the RF module 65. Each execution thread has its own context. The context may store information such as IMSI, elementary files (EF) of the corresponding subscriber identity card, detected neighboring cells, configuration for specific channels (e.g. BCCH, PCH or others), how the packets of the channels are encapsulated, or any combinations thereof. The protocol stack entity A 662 and entity B 663 are created by the OS 661 and run in a multi-tasking environment. The OS 661 provides basic operating system services, message passing, and inter-thread/process communication on the MS, as well as, schedule execution of the protocol stack entities A 662 and B 663. The OS 661 may suspend any of the protocol stack entity A 662 and entity B 663 by freezing its timeline and resuming the suspended one by de-freezing. Note that the OS 661 does not execute any frozen protocol stack entities until they are de-frozen. In addition, the OS 661 may forcibly terminate (kill) any of the protocol stack entity A 662 and entity B 663. After that, the OS 661 may recreate and start the killed protocol stack entity if required. The RF module 65 is shared between the protocol stack entity A 662 and the protocol stack entity B 663 to perform radio access.

When any of the protocol stack entities is operated in a STANDBY mode (may also referred to as an IDLE mode), the RF module 65 may be instructed to listen to paging occasions for both (U)SIM cards A and B. When the protocol stack entity A 662, for example, enters the TALKING mode (may also referred to as a DEDICATE mode) or enables a dial-up service, the protocol stack entity A 662 forces the protocol stack entity B 663 to release the occupied RF module 65 or suspend the utilization of RF module 65 until the protocol stack entity A 662 leaves the TALKING mode or disables the service. Entering the TALKING mode may indicate that the protocol stack entity A 662 is going to answer an incoming call request related to a phone number of the subscriber identity card A 61. Enabling a dial-up service may indicate that the protocol stack entity A 662 is going to make an outgoing voice or data call to a peer device by using the subscriber identity card A 61. After the protocol stack entity A 662 disables a service, such as leaves the TALKING mode or disables the dial-up service, the protocol stack entity B 663 is allowed to regain the utilization of the RF module 65 and perform the remaining task if required.

FIGS. 7A and 7B show a first embodiment of forcing the protocol stack entity B 663 into a SUSPEND mode (FIG. 7A), as well as invoking the protocol stack entity B 663 from a SUSPEND mode (FIG. 7B) respectively. In the first embodiment, the protocol stack entity B 663 may utilize an RF module 65 by at least a radio access procedure (also referred to as a Layer 1 procedure) thereof or instruct another entity/thread to perform the radio access procedure. The protocol stack entity B 663 may halt the radio access procedure to prevent utilization of the RF module 65. In FIG. 7A, when the protocol stack entity A 662 enables services, such as entering the TALKING mode or enables a dial-up service, the protocol stack entity A 662 may send a notification signal to the protocol stack entity B 663, requesting to release the RF module 65 or suspend utilization of the RF module 65. Thereafter, the protocol stack entity B 663 removes the related channel(s) and halts the radio access procedure(s). It is to be understood that removing of the related channel(s) and halting of the radio access procedure(s) may require excessive coordination among related sub-modules of the protocol stack entity B 663. A main module (also referred to as main program) may relay relevant information to instruct a variety of sub-modules to remove related channel(s) or halt the radio access procedure(s). Each information delivery and acknowledgement between sub-modules or between the main module and any sub-module may consume time. Although the channel(s) are removed, its own context remains for future cell selection, reselection or search. In this manner, the RF module 95 is no longer utilized by the protocol stack entity B 663, such that the radio resource can be occupied by the protocol stack entity A 662. Meanwhile, once the protocol stack entity A 662 disables services, such as leaves the TALKING mode or disables the dial-up service, the protocol stack entity A 662 may send another notification signal to the protocol stack entity B 663 (as shown in FIG. 10B), informing the protocol stack entity B 663 that the radio resource is available now. Thereafter, the protocol stack entity B 663 may perform initial cell selection/reselection or continue the interrupted cell selection/reselection in order to camp on a serving cell. Note that the protocol stack entity B 663 may continue to select a serving cell using the cell information stored/recorded before entering the SUSPEND mode. The stored cell information may contain at least previously detected neighboring cells. For details of the initial cell selection/reselection, reference may be made to the previously described paragraphs. In general, the proposed method in this embodiment can be seen as an inter-working mechanism between different protocol stack entities.

Figure 8A:
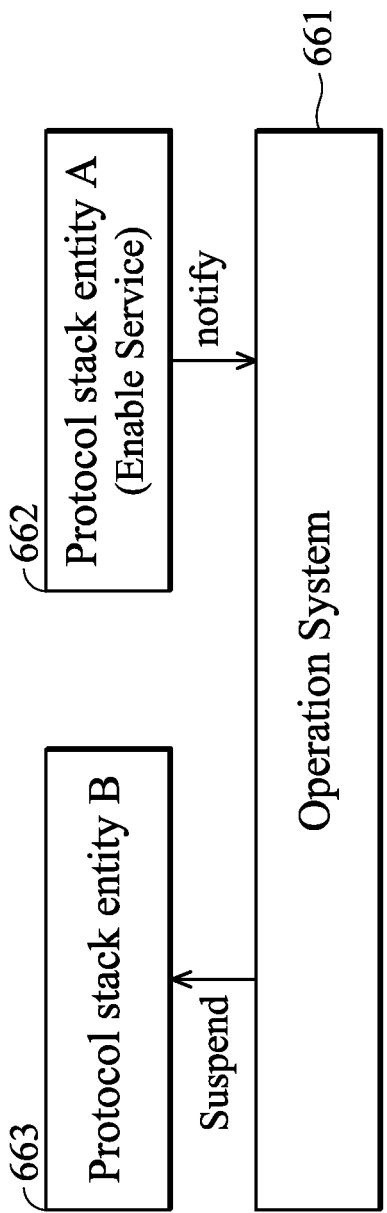
FIG. 8A shows a second embodiment of forcing a protocol stack entity into a SUSPEND mode.
Figure 8B:
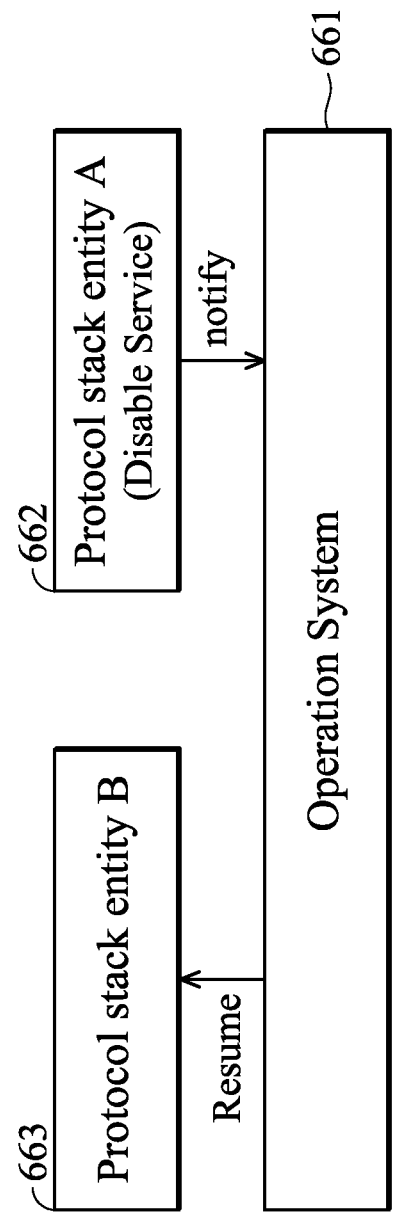
FIG. 8B shows a second embodiment of invoking a protocol stack entity from a SUSPEND mode.

FIGS. 8A and 8B show a second embodiment of forcing the protocol stack entity B 663 into a SUSPEND mode (FIG. 8A), as well as invoking the protocol stack entity B 663 from the SUSPEND mode (FIG. 8B) respectively. In the second embodiment, the protocol stack entity B 663 when executing, may utilize the radio resource to perform a radio access procedure (also referred to as a Layer 1 procedure). Therefore, the OS 661 may suspend the protocol stack entity B 663 to prevent it from utilizing the RF module 65 as the protocol stack entity A enters the TALKING mode or enable a dial-up service. In FIG. 8A, when enabling services, such as entering the TALKING mode or enabling a dial-up service, the protocol stack entity A 662 may send a notification signal to the OS

661, requesting to release the RF module 65 or suspend utilization of the RF module 65. Thereafter, the OS 661 suspends the protocol stack entity B 663 by freezing its timeline. It is to be understood that the protocol stack entity B 663 will not be aware of such suspension and its context remains for future usage when being resumed. The reserved context makes it possible for the protocol stack entity B 663 to camp on the same serving cell (the one originally committed to before entering to the SUSPEND mode) efficiently after being invoked from the SUSPEND mode. Once disabling service, such as leaving the TALKING mode or disabling the dial-up service, the protocol stack entity A 662 may send another notification signal to the OS 661 (as shown in FIG. 1B), indicating that the RF module 65 is available now. Thereafter, the OS 661 resumes the protocol stack entity B 663 by de-freezing its timeline. As a result, the protocol stack entity B 663 regularly continues the cell measurement or camps on the same serving cell. After being resumed, the protocol stack entity B 663 may perform cell reselection or even frequency scan since the original serving cell is no longer found. The second embodiment may be referred to as being protocol stack (PS) independent since the coordination is done through the OS 661.

Figure 9A:
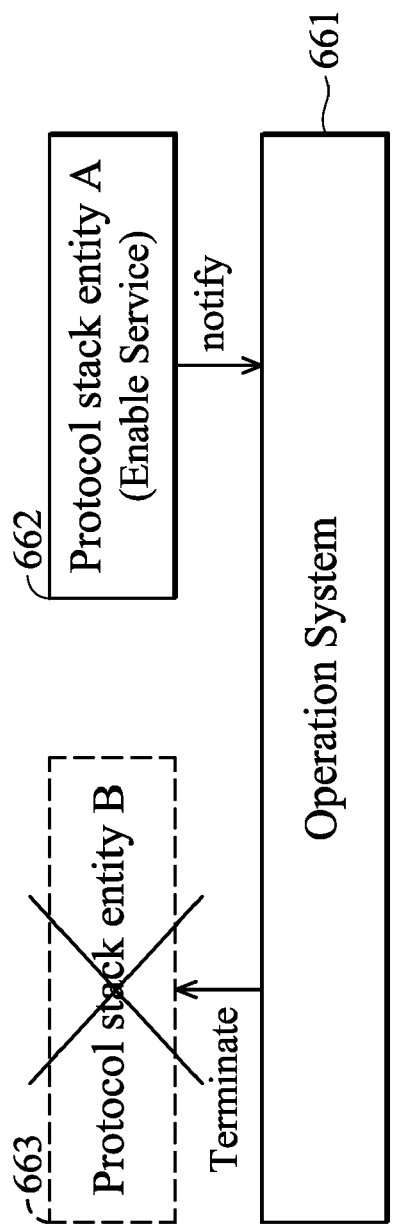
FIG. 9A shows a third embodiment of forcing a protocol stack entity into a SUSPEND mode.
Figure 9B:
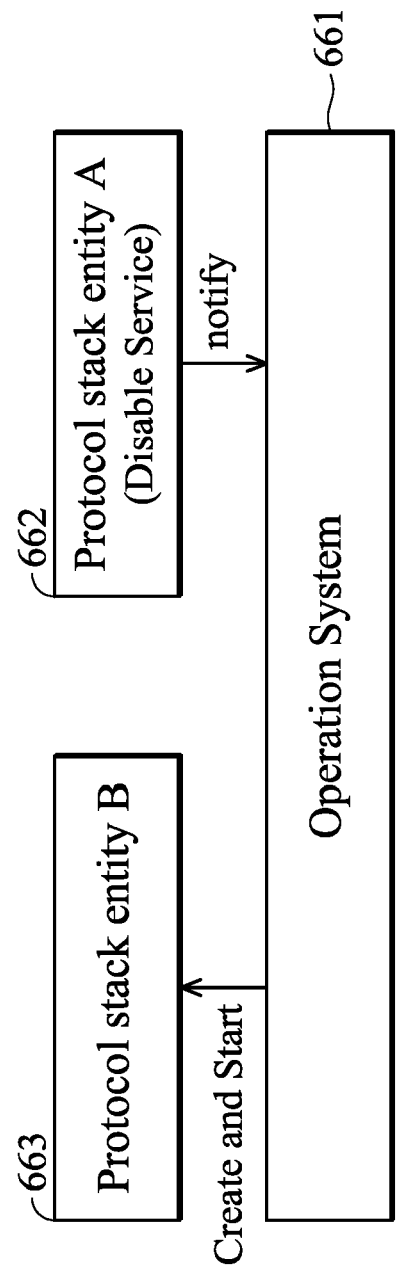
FIG. 9B shows a third embodiment of invoking a protocol stack entity from a SUSPEND mode.

FIGS. 9A and 9B show a third embodiment of forcing the protocol stack entity B into a SUSPEND mode (FIG. 9A), as well as invoking the protocol stack entity B from the SUSPEND mode (FIG. 9B) respectively. In FIG. 9A, when enabling service, such as entering the TALKING mode or enabling a dial-up service, the protocol stack entity A 662 may send a notification signal to the OS 661, requesting to release the RF module 65 or suspend the utilization of the RF module 65. Thereafter, the OS 661 terminates (kills) the protocol stack entity B 663. Note that, the related context is also no longer existent after termination of the protocol stack entity B 663. Once the protocol stack entity A 662 disables services, such as leaves the TALKING mode or disables dial-up service, another notification signal is sent to the OS 661 (as shown in FIG. 9B), indicating that the RF module 65 is available. Thereafter, the protocol stack entity B 663 may read IMSI and relevant Elementary Files (EFs) from the subscriber identity card B 62 again, and perform a PLMN search and a cell search to camp on a cell. The third embodiment may also be referred to as being PS independent. Compared to the second embodiment, recreating the protocol stack entity B 663 requires additional overhead, for example, creating and initiating a new thread and a related context.

Figure 10A:
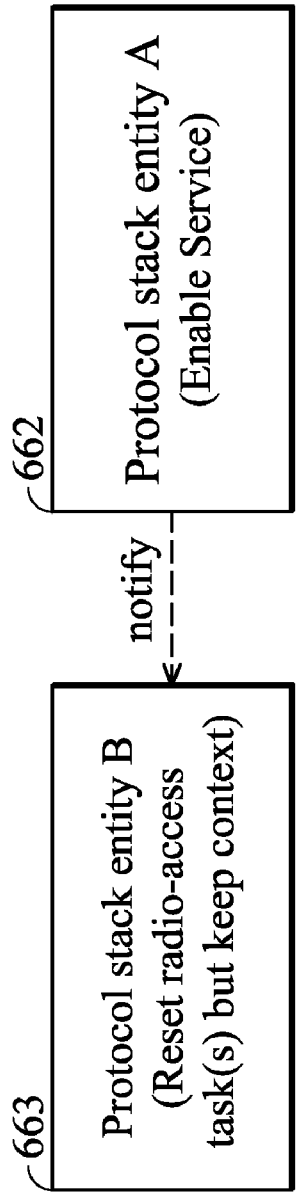
FIG. 10A shows a fourth embodiment of forcing a protocol stack entity into a SUSPEND mode.
Figure 10B:
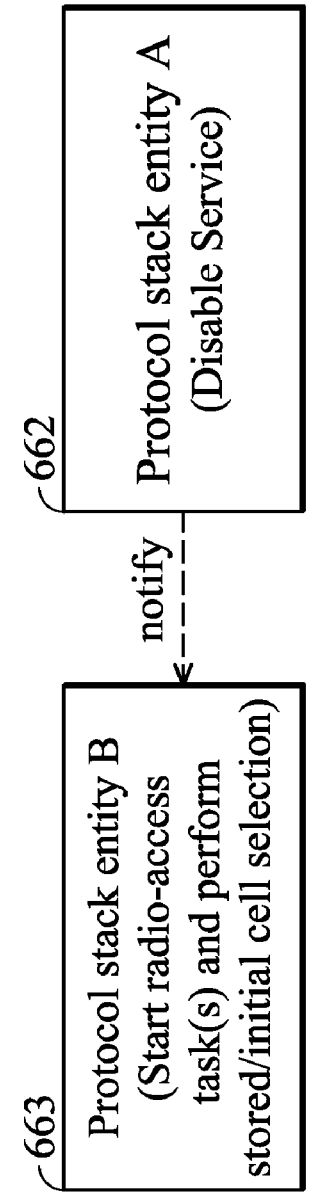
FIG. 10B shows a fourth embodiment of invoking a protocol stack entity from a SUSPEND mode.

FIGS. 10A and 10B show a fourth embodiment of forcing the protocol stack entity B 663 into a SUSPEND mode (FIG. 10A), as well as invoking the protocol stack entity B 663 from the SUSPEND mode (FIG. 10B) respectively. In the fourth embodiment, the protocol stack entity B 663 may utilize the RF module 65 by at least a radio access procedure (also referred to as a Layer 1 procedure) thereof or instruct another entity/thread to perform the radio access procedure. The protocol stack entity B 663 contains logic to reset itself so as to clear all cached information and stop all functions (e.g. submodules) therein. Examples of functions include handling of channels between the MS and BSS, or performing the radio access procedure or instruct another entity/thread to perform the radio access procedure. It is to be understood that, the protocol stack entity B 663 requires re-initialization before use. Furthermore, after certain functions relating to the channel handling and the radio access procedure are stopped, the RF module 65 is no longer occupied by the protocol stack entity B 663. In FIG. 10A, when the protocol stack entity A 662 enables services, such as entering a TALKING mode or enables a dial-up service, the protocol stack entity A 662 may send a notification signal to the protocol stack entity B 663, requesting to release the RF module 65 or suspend the utilization of the RF module 65. Thereafter, a main module (also referred to as a main program) of the protocol stack entity B 663 resets itself. Although the cached information of the main module is completely erased, its own context remains for future cell selection, reselection or search. Meanwhile, once the protocol stack entity A 662 disables services, such as leaves the TALKING mode or disables the dial-up service, the protocol stack entity A may send another notification signal to the protocol stack entity B 663 (as shown in FIG. 10B), informing the protocol stack entity B that the radio resource is available now. Thereafter, the protocol stack entity B 663 may re-initialize itself and then perform initial cell selection/reselection or continue the interrupted cell selection/reselection in order to camp on a serving cell. During re-initialization, certain variables may be declared and set to default values.

Following, the flowchart of the invention is shown, which is executed by a processor (such as the processor of FIGS. 1 and 2) of the mobile station.

Figure 11:
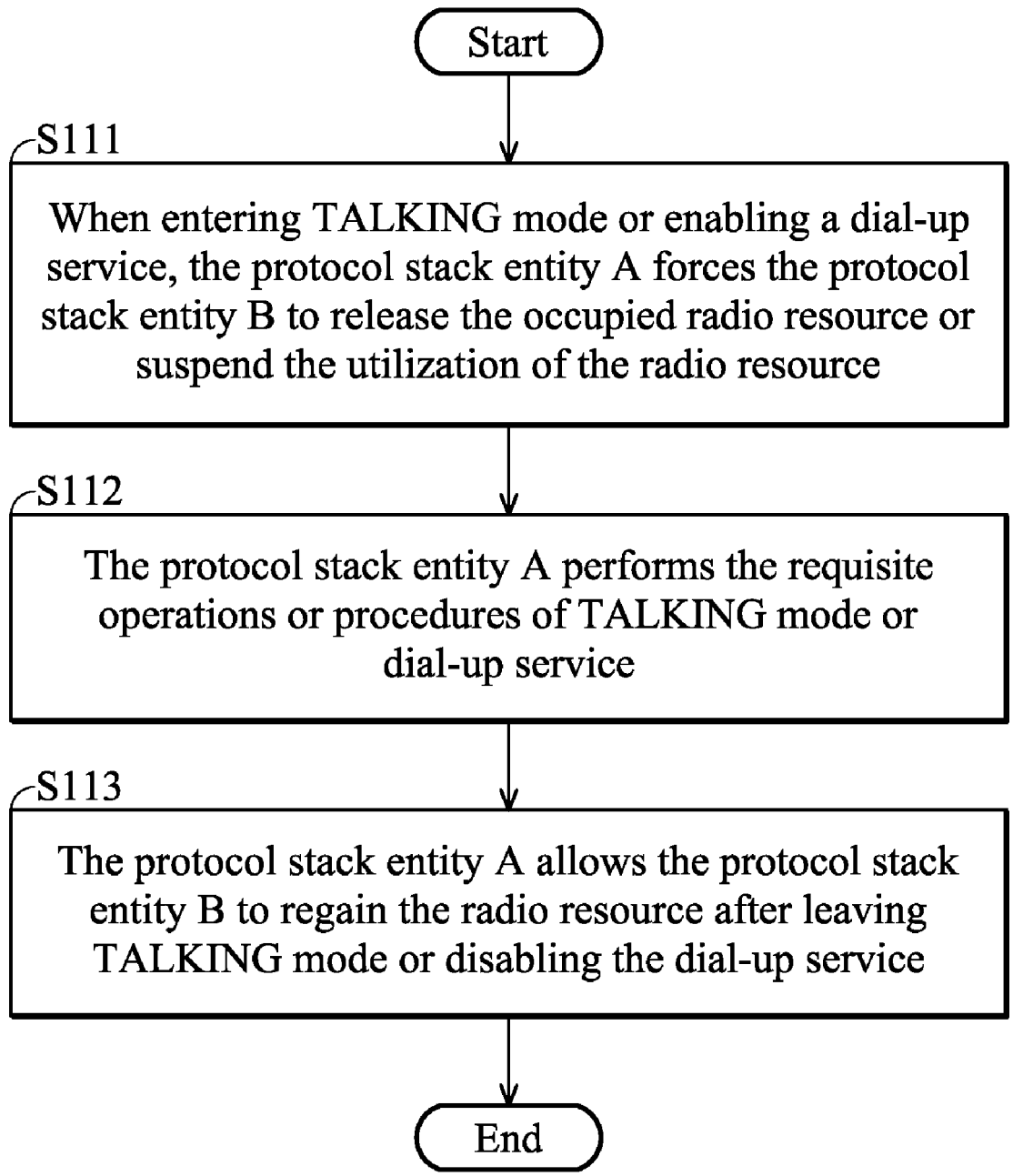
FIG. 11 shows a general flowchart of the invention.

FIG. 11 shows a flowchart illustrating an embodiment of a method for coordinating protocol stack entities to a share single radio resource (e.g. the RF module 65). Assume that both the protocol stack entities A and B are initially in a STANDBY mode. When entering the TALKING mode or enabling a dial-up service, the protocol stack entity A 662 forces the protocol stack entity B 663 to release the occupied radio resource or suspend the utilization of the radio resource (S111). Next, the protocol stack entity A 662 performs the requisite operations or procedures of the TALKING mode or dial-up service (S112). The protocol stack entity A 662 allows the protocol stack entity B 663 to regain the radio resource after leaving the TALKING mode or disabling the dial-up service (S113). Once the protocol stack entity A 662 leaves the TALKING mode or disables the dial-up service, the protocol stack entity B 663 may leave the SUSPEND mode and perform radio measurement, cell search, cell selection, cell reselection or any relevant combinations thereof to camp on a serving cell.

Figure 12B:
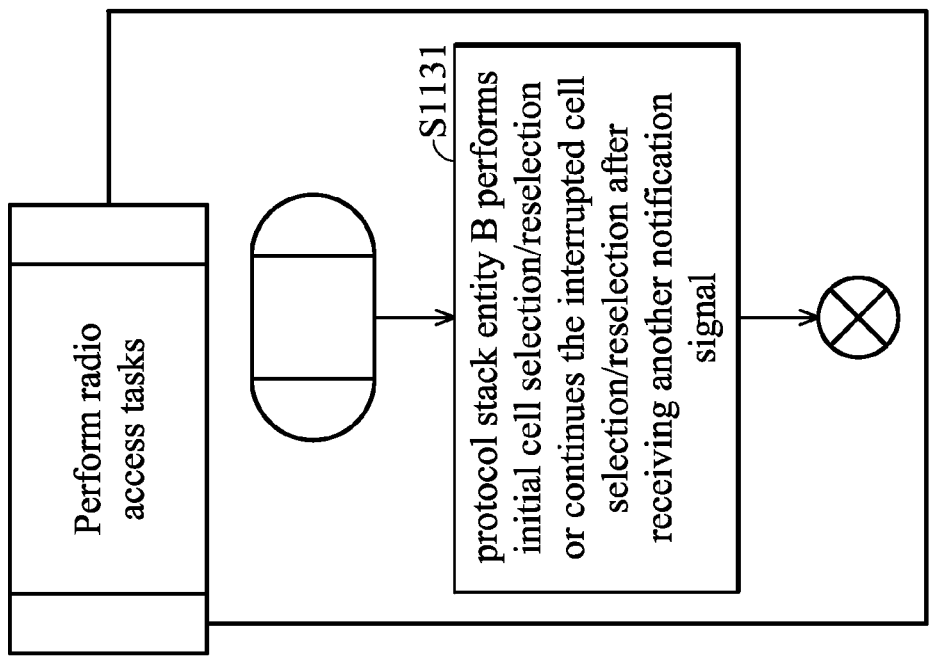
FIG. 12B shows a flowchart of invoking a protocol stack entity from a SUSPEND mode according to the first embodiment of the invention.
Figure 12A:
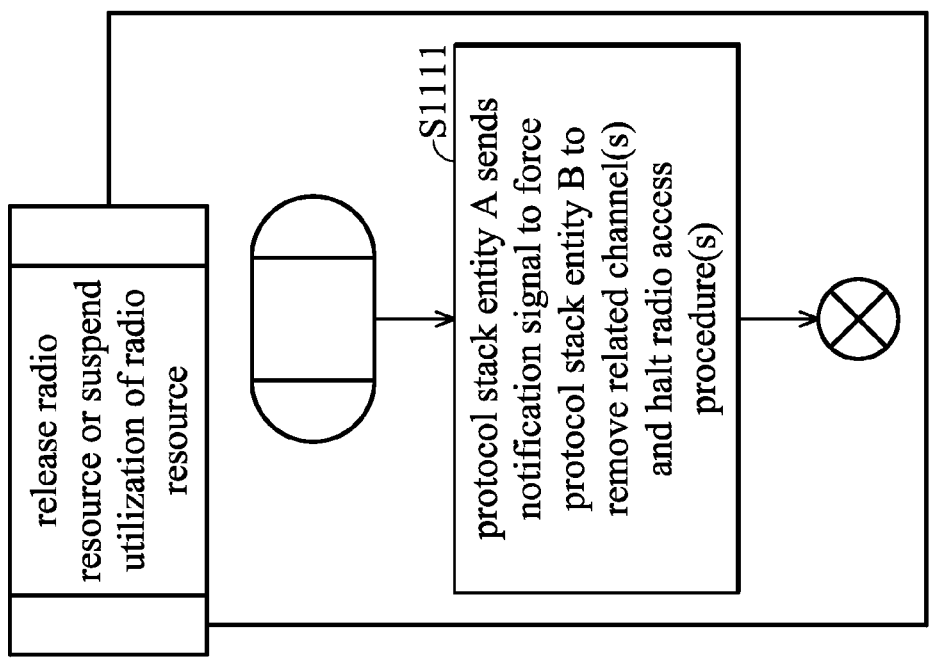
FIG. 12A shows a flowchart of forcing a protocol stack entity into a SUSPEND mode according to the first embodiment of the invention.
Figure 13B:
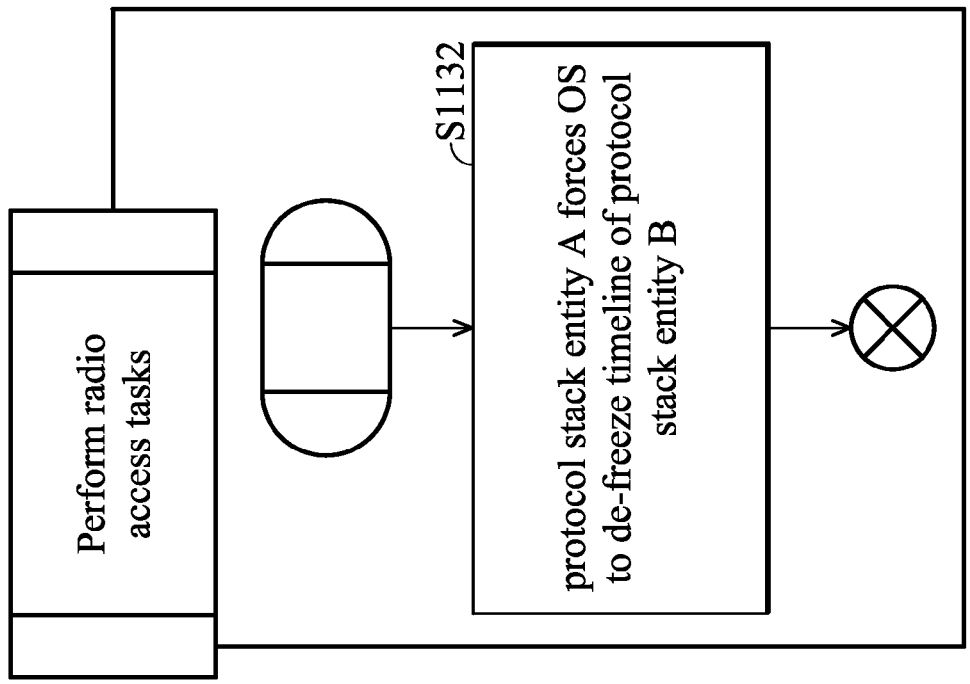
FIG. 13B shows a flowchart of invoking a protocol stack entity from a SUSPEND mode according to the second embodiment of the invention.
Figure 13A:
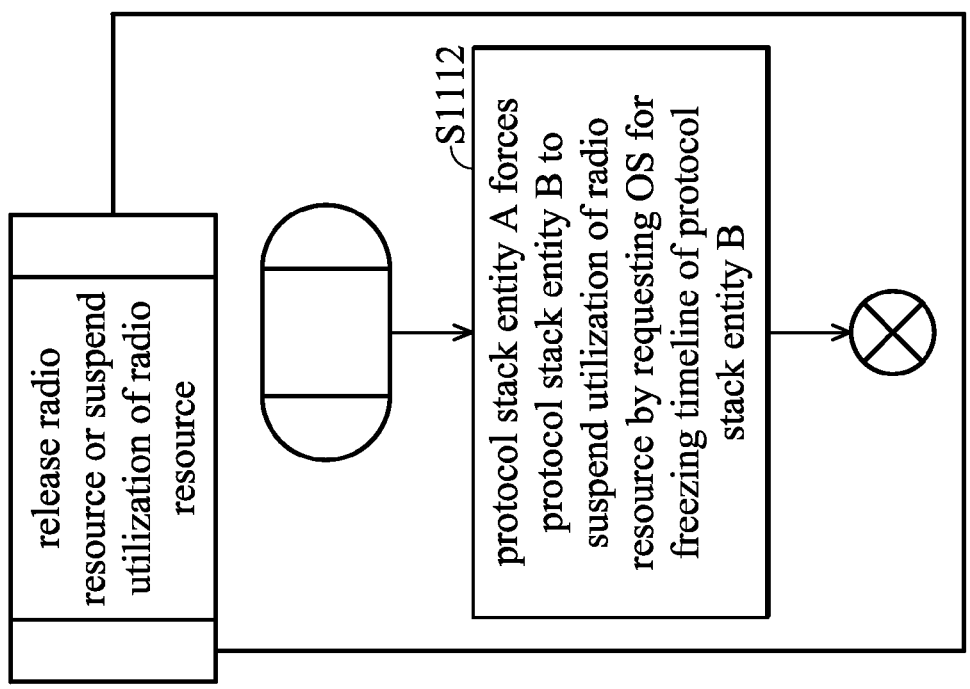
FIG. 13A shows a flowchart of forcing a protocol stack entity into a SUSPEND mode according to the second embodiment of the invention.
Figure 14B:
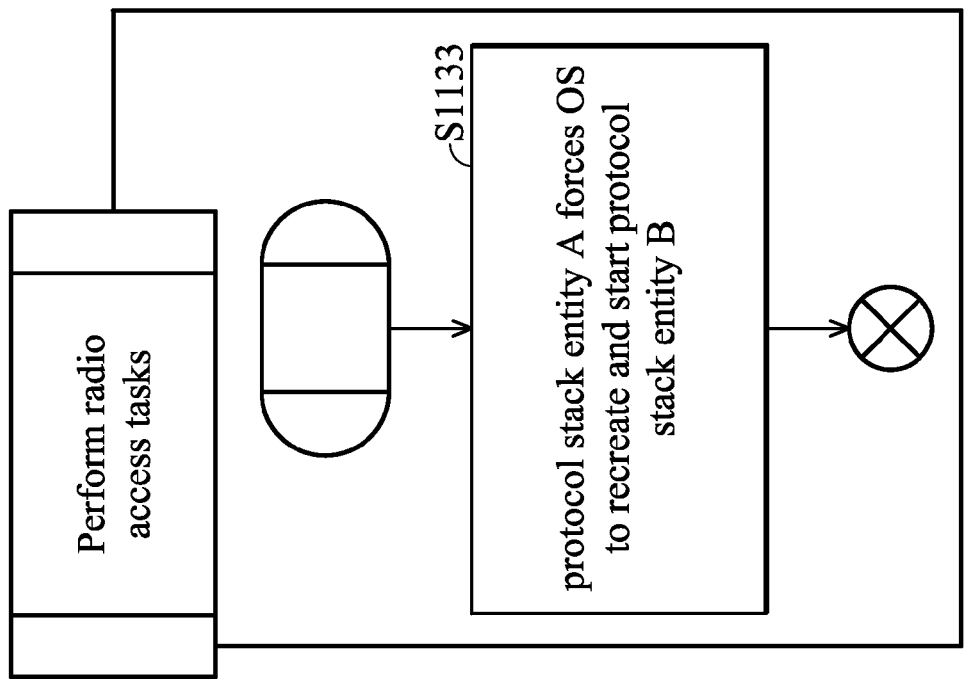
FIG. 14B shows a flowchart of invoking a protocol stack entity from a SUSPEND mode according to the third embodiment of the invention.
Figure 14A:
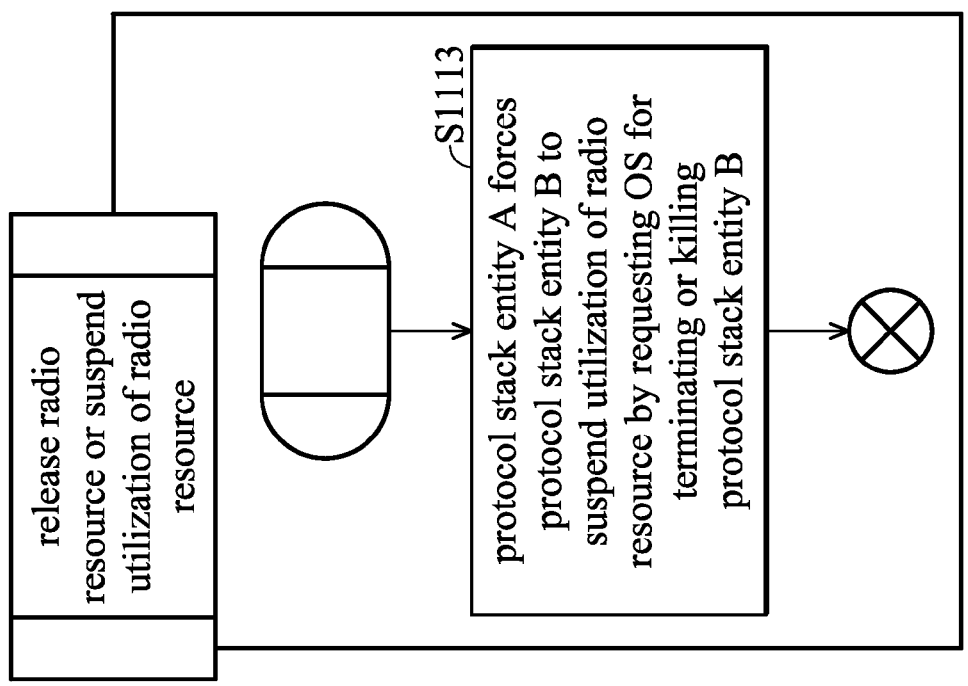
FIG. 14A shows a flowchart of forcing a protocol stack entity into a SUSPEND mode according to the third embodiment of the invention.
Figure 15B:
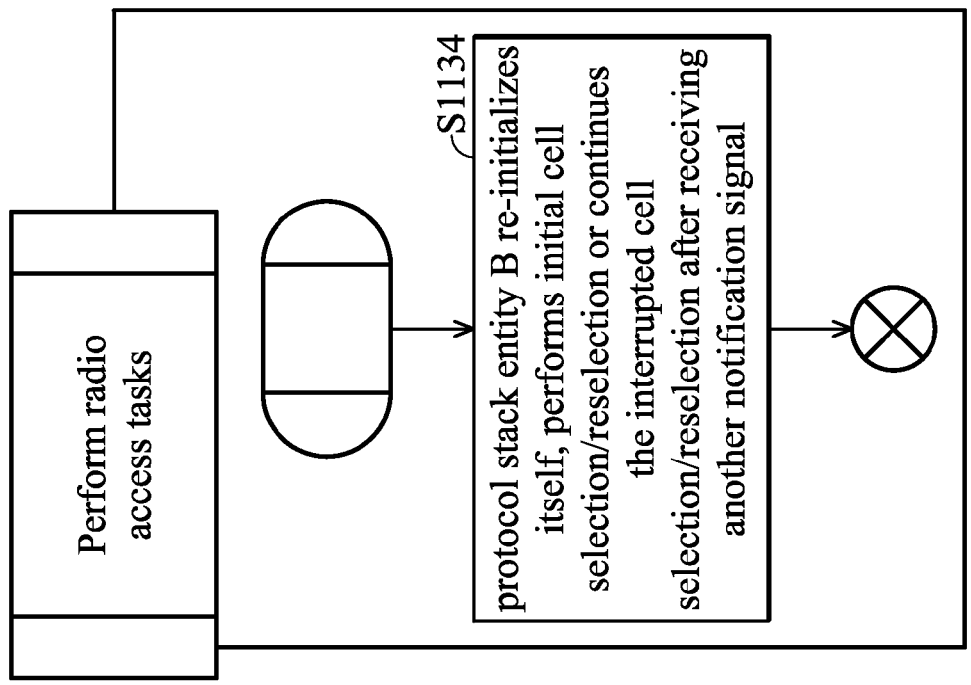
FIG. 15B shows a flowchart of invoking a protocol stack entity from a SUSPEND mode according to the fourth embodiment of the invention.
Figure 15A:
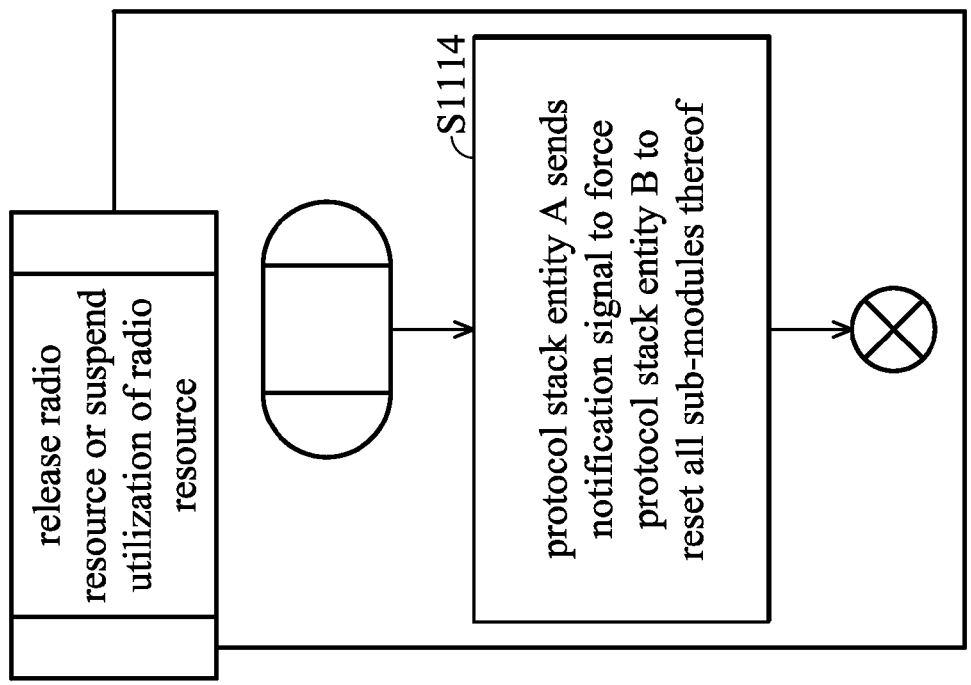
FIG. 15A shows a flowchart of forcing a protocol stack entity into a SUSPEND mode according to the fourth embodiment of the invention.

At least four approaches described below can be applied to steps S111 and S113. For the first approach, the protocol stack entity A 662 may send a notification signal to the protocol stack entity B 663, requesting to release the occupied radio resource or suspend utilization of a radio resource. After that, the protocol stack entity B 663 removes the related channel(s) and halts radio access procedure(s) (step S111 of FIG. 12A). Step S1131 of FIG. 12B shows the resuming procedure of the protocol stack entity B 663 performing initial cell selection/reselection or continuing the interrupted cell selection/reselection after receiving another notification signal from the protocol stack entity A 662. For details of the first approach, reference may be made to the descriptions of FIGS. 7A and 7B. For the second approach, the protocol stack entity A 662 forces the protocol stack entity B 663 to suspend utilization of a radio resource by requesting the OS 661 to freeze a timeline of the protocol stack entity B 663. After that, the OS 661 will not allow the frozen protocol stack entity B 663 (step S1112 of FIG. 13A) to be executed. After performing the requisite operations or procedures of the TALKING mode or dial-up service, the protocol stack entity A 662 forces the OS 661 to de-freeze the timeline of the protocol stack entity B 663, and enable the protocol stack entity B 663 to be executed to perform initial cell selection/reselection or continue the interrupted cell selection/reselection (step S1132 of FIG. 13B). For details of the second approach, reference may be made to descriptions of FIGS. 8A and 8B. For the third approach, the protocol stack entity A 662 forces the protocol stack entity B 663 to suspend utilization of a radio resource by requesting the OS 661 to terminate (or killing) the protocol stack entity B 662. Thereafter, the protocol stack entity B 663 disappears (step S1113 of FIG. 14A). After performing the requisite operations or procedures of the TALKING mode or dial-up service, the protocol stack entity A 662 forces the OS 661 to recreate and start the protocol stack entity B 663 again, and enables the protocol stack entity B 663 to perform a PLMN search and a cell search to camp on a cell. For details of the third approach, reference may be made to descriptions of FIGS. 9A and 9B. For the fourth approach, the protocol stack entity A 662 sends a notification signal to the protocol stack entity B 663, requesting to release the occupied radio resource or suspend utilization of a radio resource. Thereafter, the protocol stack entity B 663 resets itself (step S1114 of FIG. 15A). Step S1134 of FIG. 15B shows the resuming procedure of the protocol stack entity B 663 re-initializing itself and then performing initial cell selection/reselection or continuing the interrupted cell selection/reselection after receiving another notification signal from the protocol stack entity A 662. For details of the fourth approach, reference may be made to descriptions of FIGS. 10A and 10B.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for coordinating protocol stack entities to share a single radio resource, executed by a processor of a mobile station, comprising the step of:
    after a first protocol stack entity for a first subscriber identity card enters a TALKING mode or enables a dial-up service, forcing a second protocol stack entity for a second subscriber identity card to release the radio resource or suspend utilization of the radio resource, thereby enabling the radio resource to be utilized to perform requisite operations or procedures of the TALKING mode or the dial-up service wherein the radio resource is shared by the first and second protocol stack entities.

2. The method as claimed in claim 1, wherein the second protocol stack entity is a thread performing a layer 2 function and a layer 1 function operating the radio resource.

3. The method as claimed in claim 1, wherein the second protocol stack entity is a thread performing a layer 2 function and capable of instructing another entity to perform a layer 1 function operating the radio resource.

4. The method as claimed in claim 1, wherein the forcing step further comprises sending a first notification signal from the first protocol stack entity to force the second protocol stack entity to release the radio resource or suspend utilization of the radio resource.

5. The method as claimed in claim 4, further comprising a step of removing a channel and halting a radio access procedure of the second protocol stack entity to release the radio resource or suspend utilization of the radio resource after receipt of the first notification signal by the second protocol stack entity.

6. The method as claimed in claim 5, further comprising a step of sending a second notification signal to the second protocol stack entity, informing the second protocol stack entity that the radio resource is available now, after the first protocol stack entity leaves the TALKING mode or disables the dial-up service.

7. The method as claimed in claim 4, further comprising a step of resetting the second protocol stack entity to release the radio resource or suspend utilization of the radio resource after receipt of the first notification signal by the second protocol stack entity.

8. The method as claimed in claim 7, further comprising a step of sending a second notification signal to the second protocol stack entity, informing the second protocol stack entity that the radio resource is available now, after the first protocol stack entity leaves the TALKING mode or disables the dial-up service.

9. The method as claimed in claim 1, wherein the forcing step further comprises sending a first notification signal from the first protocol stack entity to force an operating system (OS) to freeze a timeline of the second protocol stack entity, wherein the frozen second protocol stack entity is not able to be executed.

10. The method as claimed in claim 9, further comprising a step of sending a second notification signal to force the OS to de-freeze the timeline of the second protocol stack entity after the first protocol stack entity leaves the TALKING mode or disables the dial-up service.

11. The method as claimed in claim 1, wherein the forcing step further comprises sending a first notification signal from the first protocol stack entity to force an operating system (OS) to terminate or kill the second protocol stack entity.

12. The method as claimed in claim 11, further comprising a step of sending a second notification signal to force the OS to create and start the second protocol stack entity after the first protocol stack entity leaves the TALKING mode or disables the dial-up service.

13. A system for coordinating protocol stack entities corresponding to a first subscriber identity card and a second subscriber identity card respectively to share a single radio frequency (RF) module and a single radio resource, comprising:
    a processor coupled to the RF module, the first and second subscriber identity cards, and executing a first protocol stack entity for the first subscriber identity card, and a second protocol stack entity for the second subscriber identity card in a multi-tasking environment,
    wherein, when executing, the first protocol stack entity forces the second protocol stack entity to release the RF module or suspend utilization of the RF module after the first protocol stack entity enters TALKING mode or enables a dial-up service, thereby enables the RF module to be utilized to perform requisite operations or procedures of the TALKING mode or the dial-up service wherein the radio resource is shared by the first and second protocol stack entities.

14. The system as claimed in claim 13, wherein, when executing, the first protocol stack entity is going to answer an incoming call request related to a phone number of the first subscriber identity card when entering the TALKING mode.

15. The system as claimed in claim 13, wherein, when executing, the first protocol stack entity is going to make an outgoing voice or data call to a peer device by using the first subscriber identity card when enabling the dial-up service.

16. The system as claimed in claim 13, wherein, when executing, the first protocol stack entity sends a first notification signal to request the second protocol stack entity to release the RF module or suspend utilization of the RF module, the second protocol stack entity removes a channel and halts a radio access procedure operating the RF module after receipt of the first notification signal, and the first protocol stack entity sends a second notification signal to inform the second protocol stack entity that the radio resource is available now after leaving the TALKING mode or disabling the dial-up service, thereby enabling the second protocol stack entity to camp on a cell.

17. The system as claimed in claim 13, wherein, when executing, the first protocol stack entity sends a first notification signal to request the second protocol stack entity to release the RF module or suspend utilization of the RF module, the second protocol stack entity resets itself to clear its cached information and stop all functions thereof after receipt of the first notification signal, and the first protocol stack entity sends a second notification signal to inform the second protocol stack entity that the radio resource is available now after leaving the TALKING mode or disabling the dial-up service, thereby enabling the second protocol stack entity to re-initialize itself and camp on a cell.

18. The system as claimed in claim 13, wherein, when executing, the first protocol stack entity sends a first notification signal to request an operating system (OS) to force the second protocol stack entity to release the RF module or suspend utilization of the RF module, the OS freezes a timeline of the second protocol stack entity after receipt of the first notification signal, and the first protocol stack entity sends a second notification signal to force the OS to de-freeze the timeline of the second protocol stack entity after leaving the TALKING mode or disabling the dial-up service, thereby enabling the second protocol stack entity to camp on a cell.

19. The system as claimed in claim 13, wherein, when executing, the first protocol stack entity sends a first notification signal to request an operating system (OS) to force the second protocol stack entity to release the RF module or suspend utilization of the RF module, the OS terminates the second protocol stack entity after receipt of the first notification signal, and the first protocol stack entity sends a second notification signal to force the OS to recreate and start the second protocol stack entity after leaving the TALKING mode or disabling the dial-up service, thereby enabling the second protocol stack entity to camp on a cell.

20. A method executed by a processor of a mobile station for sharing a single radio resource among protocol stack entities, comprising the step of:
  simultaneously camping, by the mobile station, on two cells using a first subscriber identity card and a second subscriber identity card; and
  responsive to a first protocol stack entity associated with the first subscriber identity card entering a predetermined state, forcing a second protocol stack entity associated with the second subscriber identity card to perform one of: release the radio resource and suspend utilization of the radio resource, wherein the predetermined state comprises one of: a TALKING mode and enablement of a dial-up service wherein the radio resource is shared by the first and second protocol stack entities.

* * * * *